United States Patent
Vamvas

(10) Patent No.: US 10,012,113 B2
(45) Date of Patent: Jul. 3, 2018

(54) COMBINED CYCLE PLANT WITH THERMAL ENERGY STORAGE

(71) Applicant: Vassilios Vamvas, Bedford, MA (US)

(72) Inventor: Vassilios Vamvas, Bedford, MA (US)

( * ) Notice: Subject to any disclaimer, the term of this patent is extended or adjusted under 35 U.S.C. 154(b) by 407 days.

(21) Appl. No.: 14/659,366

(22) Filed: Mar. 16, 2015

(65) Prior Publication Data

US 2015/0267566 A1    Sep. 24, 2015

Related U.S. Application Data

(60) Provisional application No. 61/954,619, filed on Mar. 18, 2014.

(51) Int. Cl.
| | |
|---|---|
| *F01K 1/00* | (2006.01) |
| *F01K 3/18* | (2006.01) |
| *F01K 23/18* | (2006.01) |
| *F01K 23/10* | (2006.01) |
| *F01K 13/02* | (2006.01) |
| *F01K 7/16* | (2006.01) |
| *F28D 20/02* | (2006.01) |
| *F01K 3/00* | (2006.01) |

(52) U.S. Cl.
CPC ............... *F01K 3/186* (2013.01); *F01K 3/00* (2013.01); *F01K 7/16* (2013.01); *F01K 13/02* (2013.01); *F01K 23/10* (2013.01); *F01K 23/18* (2013.01); *F28D 20/02* (2013.01); *F28D 20/026* (2013.01); *Y02E 20/16* (2013.01); *Y02E 60/145* (2013.01); *Y02E 70/30* (2013.01); *Y02P 80/154* (2015.11)

(58) Field of Classification Search
CPC ... F01K 3/186; F01K 3/00; F01K 7/16; F01K 23/18; F01K 3/18; F01K 3/12; F01K 23/10; F28D 20/026; F02C 6/18; F05D 2220/72
See application file for complete search history.

(56) References Cited

U.S. PATENT DOCUMENTS

| | | | |
|---|---|---|---|
| 6,400,896 B1* | 6/2002 | Longardner | F28D 20/02 |
| | | | 126/400 |
| 8,904,793 B2* | 12/2014 | Hemrle | F01K 3/12 |
| | | | 60/643 |
| 2009/0121495 A1* | 5/2009 | Mills | F01K 3/00 |
| | | | 290/4 D |
| 2013/0292084 A1* | 11/2013 | Luz | F28D 20/00 |
| | | | 165/10 |

(Continued)

OTHER PUBLICATIONS

Wade Industrial, Types of Steam, Jul. 14, 2011.*

*Primary Examiner* — Pascal M Bui Pho
*Assistant Examiner* — Edwin Kang

(57) ABSTRACT

A combined cycle power plant for frequent stops and startups comprises at least one gas turbine, a heat recovery steam generator, at least one steam turbine and a thermal energy storage and retrieval system utilizing latent heat of fusion. Phase change materials receive thermal charge from two sources: (a) renewable energy generation plants, when their production exceeds demand and (b) gas turbine exhaust heat. The thermal energy storage and retrieval system, discharges efficiently thermal energy for steam production, which keeps the at least one steam turbine preheated and ready for fast startups, thus increasing the plant's flexibility and efficiency.

Figure 1:
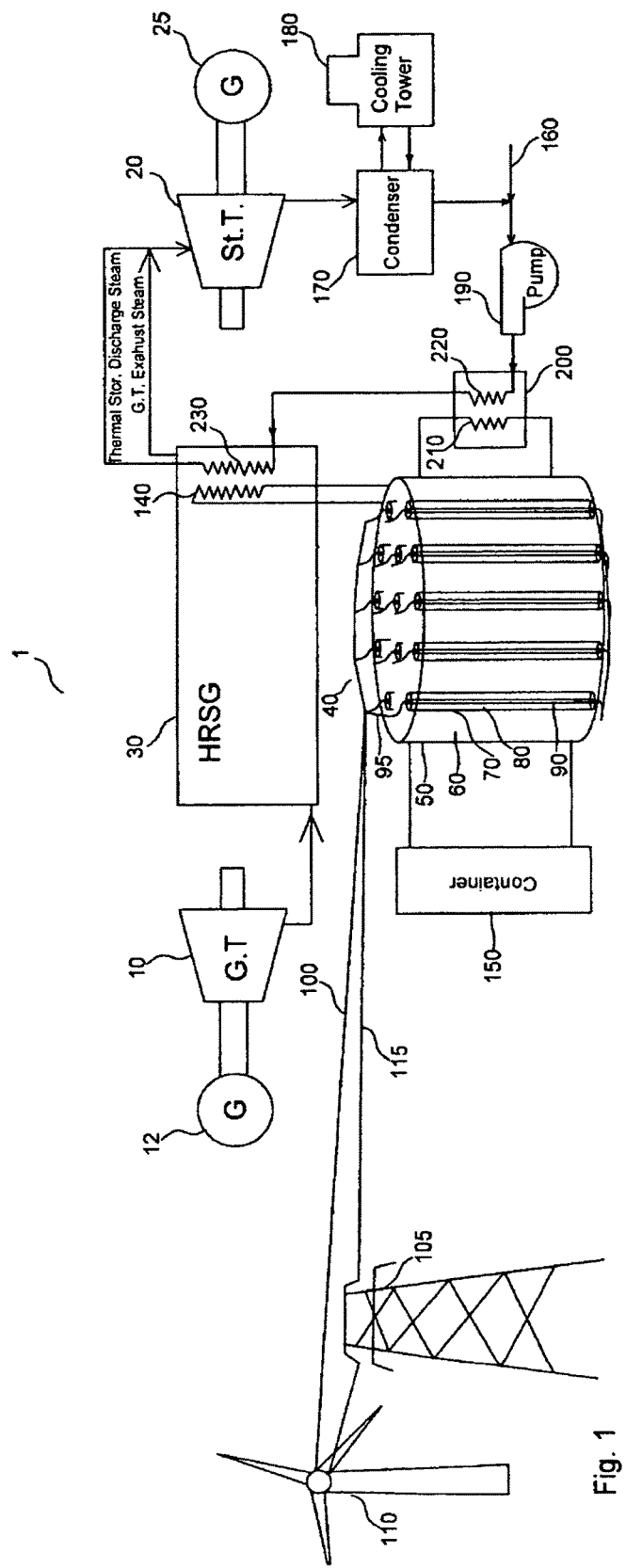

A novel two stage latent thermal energy storage system provides at least supercritical steam.

3 Claims, 5 Drawing Sheets

(56) References Cited

U.S. PATENT DOCUMENTS

| | | | | |
|---|---|---|---|---|
| 2014/0053554 A1* | 2/2014 | Tartibi | ................... | F01K 3/186 |
| | | | | 60/643 |
| 2014/0060046 A1* | 3/2014 | Takahashi | ............... | F28D 20/02 |
| | | | | 60/641.8 |
| 2014/0102073 A1* | 4/2014 | Pang | ........................ | F01K 3/00 |
| | | | | 60/39.182 |
| 2014/0366536 A1* | 12/2014 | Muren | ................... | F03G 6/065 |
| | | | | 60/641.8 |
| 2015/0128558 A1* | 5/2015 | Gulen | ................... | F01K 23/10 |
| | | | | 60/39.182 |

* cited by examiner

COMBINED CYCLE PLANT WITH THERMAL ENERGY STORAGE

CROSS-REFERENCE TO RELATED APPLICATIONS

This application claims the benefit of U.S. provisional patent application Ser. No. 61/954,619, filed 2014 Mar. 18 by the present inventor. Also, this application claims the benefit of U.S. patent application Ser. No. 20140327338 submitted by the same inventor and incorporated herein by reference in its entirety.

BACKGROUND

Prior Art

The following is a tabulation of some prior art that presently appears relevant:

Patents

| Pat. No. | Kind Code | Issue Date | Patentee |
|---|---|---|---|
| 8,938,966 | B2 | 2015 Jan. 27 | Jockenhoevel |
| 8,739,512 | B2 | 2014 Jun. 03 | Mills |
| 7,971,437 | B2 | 2011 Jul. 5 | Flynn |
| 7,089,727 | B2 | 2006 Aug. 15 | Schutz |

The growing number of renewable electricity production plants, such as wind and solar plants has altered the electricity source mix provided to the electricity grid. Grid operators face challenges to optimally integrate renewable electrical power with traditional dispatchable electrical power, due to the uncertain and intermittent output of the renewable energy plants. Therefore, there is a need for an efficient dispatchable source of electricity with a fast startup capability to compensate for the lack of power production when the wind stops blowing and/or the sun stops shining.

Such a source of electricity could be a single cycle plant which consists of a compressor, a combustion chamber and a gas turbine. However, this plant is considerably less efficient than a combined cycle plant. Combined cycle gas turbine plants consist of one or more gas turbines, for a topping thermodynamic cycle, a heat-recovery steam generator and one or more steam turbines, for a bottoming cycle. Combined cycle plants though the bottoming steam turbines require a substantial amount of time for a "cold" or even a "hot" startup. Steam turbine proper preheating for fast startups requires the consumption of a considerable amount of fossil fuels, which lower the plant's efficiency, due to fuel costs and increase environmental pollution.

The present invention discloses a novel combined cycle plant with a fast startup capability, which allows bottoming steam turbines to start producing electricity as fast as the topping gas turbines, while they reduce fossil fuel consumption. Preheating is achieved through the thermal discharge of a novel thermal energy storage system, which possesses high efficiency as it uses latent heat of fusion of phase change materials (PCM). Latent heat of fusion provides considerably higher energy density than sensible heat. Also, this novel thermal energy storage system effectively tackles the high thermal resistance of PCMs, during thermal discharge, which is considered the main disadvantage of using latent heat for thermal energy storage systems. The high thermal resistance of most PCMs currently used for thermal storage, such as inorganic molten salts, is due to the fact that a molten salt freezes on a cold heat transfer surface. Thus it forms an insulation barrier of solid (cold) PCM between a heat transfer fluid and the molten (hot) PCM. Solid PCM has very low thermal conductivity, which slows down the heat exchange rate slows and therefore the thermodynamic efficiency.

The thermal energy storage system is thermally charged with the use of renewable energy, when the renewable production exceeds its demand, with low cost grid electricity, such as nightly rates, as well as heat from the topping turbines exhausts. Steam, generated from thermal discharge, is used to keep the one or more bottoming steam turbines well preheated. It can even keep them rotating at a low rpm, which lowers bottoming steam turbine back pressure, thus allowing faster ramp-up of topping gas turbines. This way the combined cycle plant succeeds a fast startup to its maximum capacity, while it reduces fossil fuel consumption and environmental pollution.

U.S. Pat. No. 7,971,437 discusses a thermal energy storage apparatus utilizing a phase change medium. However, it does not address the PCM solidification problem, which limits thermodynamic efficiency. Neither does patent application US 2008/0022683, which proposes a system for providing thermal energy to a thermodynamic machine for generating electrical power, deal with PCM thermodynamic limitations. In addition, this patent application refers to a single only thermodynamic cycle, which is less efficient than the combined cycle.

Field of Use

The present invention relates to a combined cycle power plant with latent heat thermal energy storage.

LIST OF FIGURES

Figure 2:
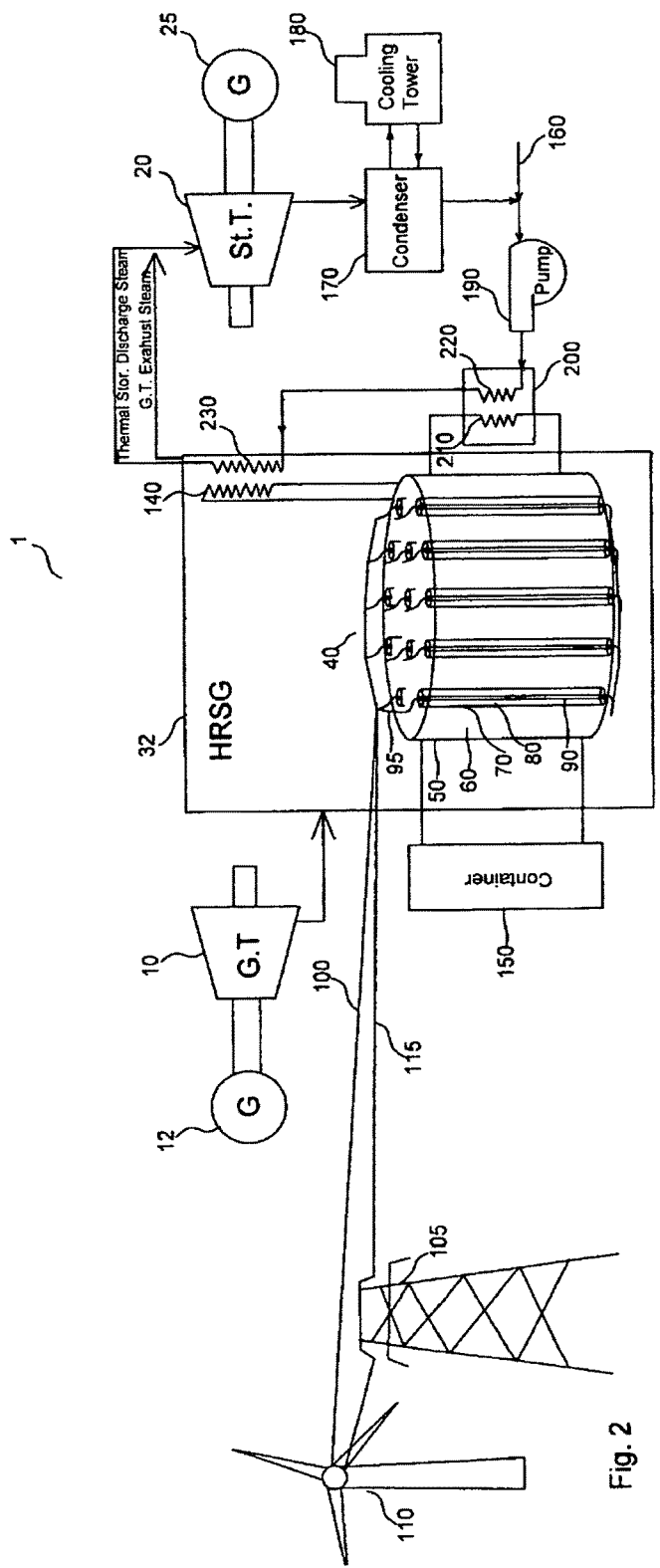
Figure 3:
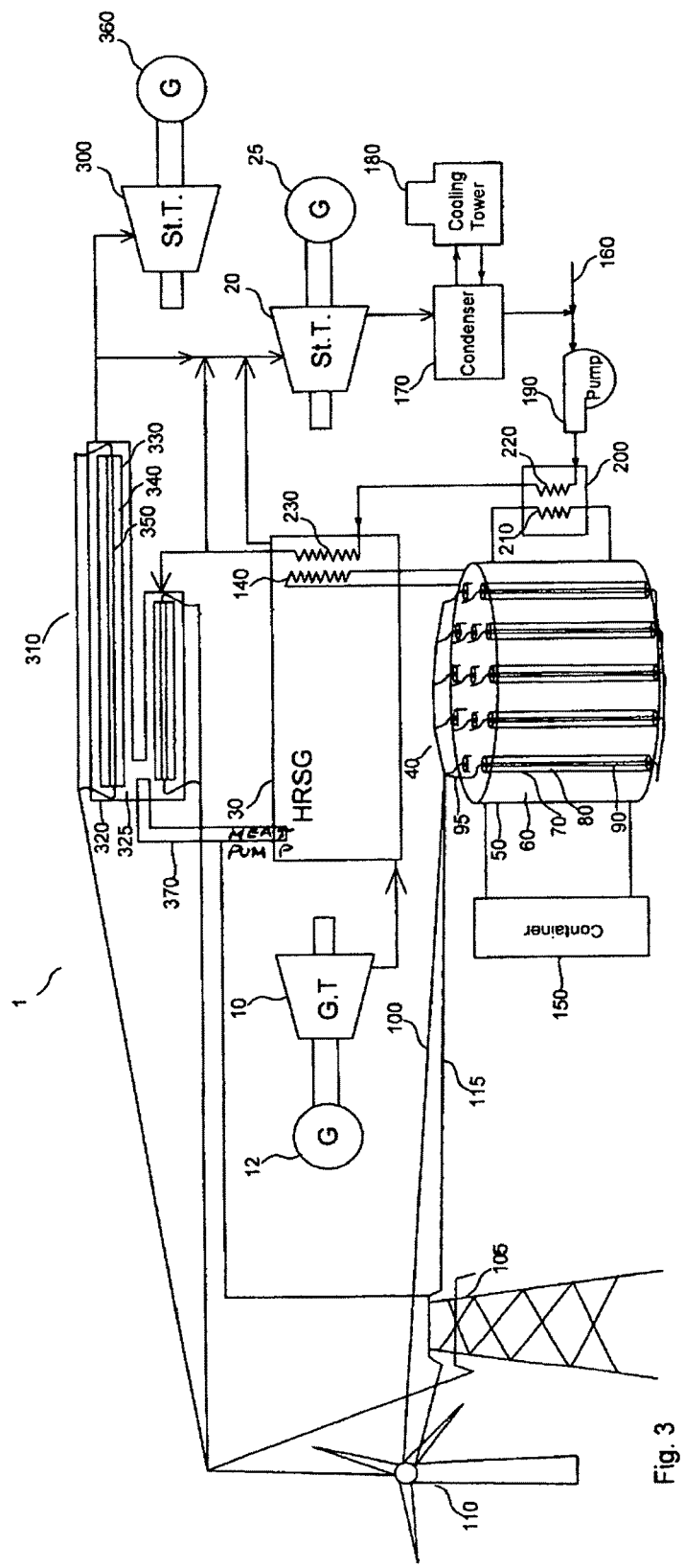
Figure 4:
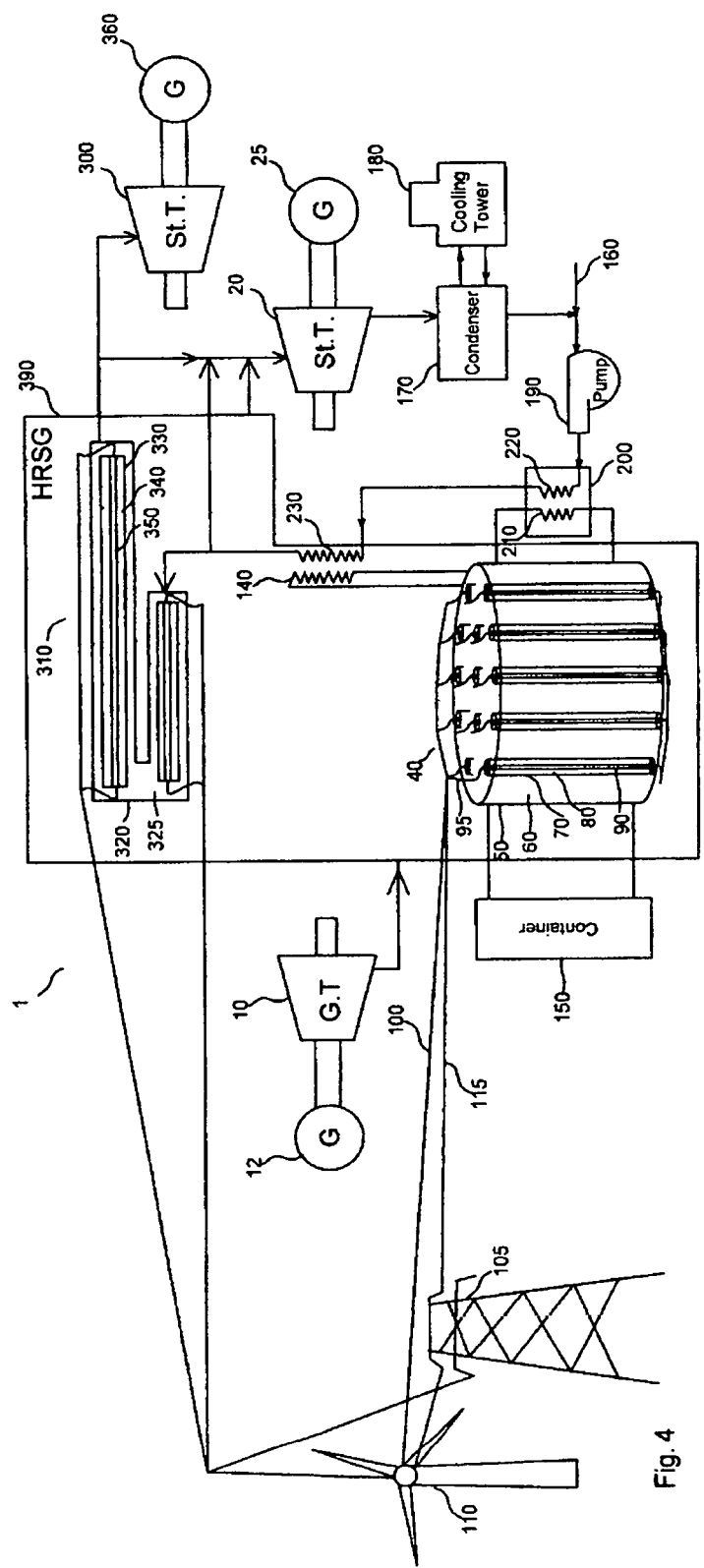
Figure 5:
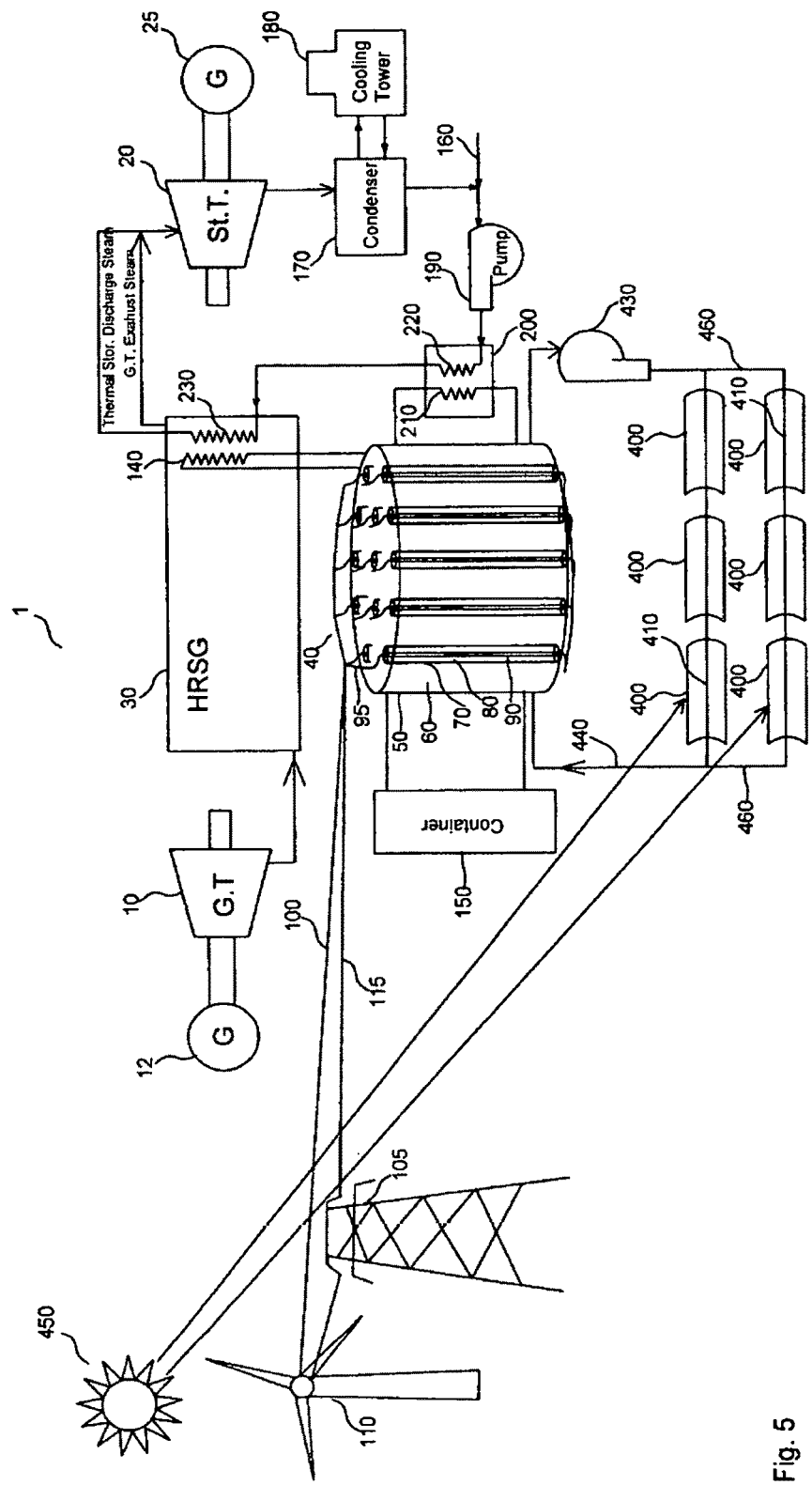

FIG. 1 shows a combined cycle plant with a thermal energy storage and retrieval system FIG. 2 shows a combined cycle plant with a thermal energy storage and retrieval system included within the plant's heat recovery steam generation FIG. 3 shows a combined cycle power plant with a two-stage thermal energy storage and retrieval system FIG. 4 shows a combined cycle power plant with a two-stage thermal energy storage and retrieval system included within the plant's heat recovery steam generation FIG. 5 shows a combined cycle power plant with a thermal energy storage and retrieval system charged by solar thermal power

SUMMARY

This disclosure relates to combined cycle power plants with latent heat of fusion thermal energy storage. Energy storage is used in order to produce steam at the time that the plant is not in operation for keeping the bottoming turbines preheated, thus securing the flexibility of fast startups.

More specifically, the present invention discloses a flexible combined cycle power plant which utilizes an efficient latent heat based thermal energy storage and retrieval system to succeed fast plant startups to the designated capacity. It comprises one or more topping gas turbines, a heat recovery steam generator, operatively connected to receive the exhaust fluid from the at least one gas turbine as well as a water/condensate supply to produce a steam to activate the steam turbine for electricity production.

The latent thermal energy storage and retrieval system is also operatively connected with the heat recovery steam generator to capitalize on the gas exhaust fluid. The exhaust fluid thermally charges the phase change material. The thermal discharge of the energy storage system occurs when the gas turbine is not in operation. One or more bottoming cycle steam turbines can receive either the steam produced, when the gas turbines are in operation for electricity production or the steam produced from the thermal discharge process, which is used to maintain the bottoming steam turbines properly preheated for fast plant startups The fast startups, as mentioned, add substantial flexibility to the plant and further encourage the growth of renewable energy.

The thermal energy storage and retrieval system may be contained within the heat recovery steam generator (HSRG). This materializes the novel concept of Heat Recovery, Storage & Steam Generator (HRSSG), which is an aspect of the present invention. It is also an aspect of this invention the production of supercritical or even ultra-supercritical steam by utilizing a novel two-stage latent heat thermal energy storage and retrieval system. This system provides the capability of an once-through HRSSG, by employing two different PCMs and a phenomenon associated with dry steam. This phenomenon enhances the thermodynamic efficiency of the heat exchange process between a molten PCM and dry steam at temperatures greater than or equal to the ones producing the dry steam (~400° C.). Unfortunately, there is not a single PCMs with a wide temperature range operational stability i.e. 20-70° C. to 700-800° C. But there are materials such as inorganic salts and metals or metal alloys with low melting temperatures that can accommodate the temperature spectrum into two stages.

In the present invention the PCMs used are not circulated in fluid networks to run the risk of freezing. They are static, enclosed in containers. These containers may be metal containers. The PCM tubes may employ electric heating elements, such as electrical resistors or electrical heat pumps, which can provide heat, if needed. These electric heating elements are positioned in proximity to the PCM container walls. This novelty provides the capability of heating the PCM container walls to melt solid PCM accumulation, thus improving the thermodynamic efficiency of the thermal discharge process.

DETAILED DESCRIPTION

FIG. 1 shows a combined cycle gas turbine plant 1, which includes at least one gas turbine for topping cycle 10 coupled with generator 12, at least one steam turbine for bottoming cycle 20 coupled with generator 25, and at least one heat-recovery steam generator (HRSG) 30. The combined cycle gas turbine plant 1 utilizes the at least one HRSG 30 to generate a first steam by heat exchange with expanded fluid formed by expanding energetic fluid through the at least one gas turbine 10. The generated steam is expanded through the at least one steam turbine 20. The HRSG 30 is disposed to utilize waste heat in the form of heated exhaust air from the at least one gas turbine 10 in order to vaporize supplied water or condensate and produce a first steam. This steam enters the at least one steam turbine 20.

The combined cycle gas turbine plant 1 also includes at least one thermal energy storage and retrieval system 40, comprising at least one container 50, which is filled with a heat transfer fluid (HTF) 60. The at least one container 50, which may have a form, for example a tank or a tube, also contains at least one smaller container 70. At least one smaller container 70 may be fully contained within at least one container 50, or it may be partially contained (housed) in the at least one container 50. Container 70 contains a phase change material (PCM) 80, capable of changing from solid to liquid when is thermally charged and from liquid to solid when discharged. Container 70 also at least one electric heating element 90, which may be an electric resistor or an electric heat pump, electrically connected via line 100 to the at least one renewable energy plant 110, through electrical connector 95, as shown in FIG. 1. The at least one electric heating element 90 is also electrically connected to the electricity grid 105 via line 115. Heating element 90 is positioned to be in proximity to the at least one smaller container's walls. Heating element 90 may be activated during thermal discharge, in order to prevent PCM from solidification. PCM solidification poses a major obstacle in retrieving thermal energy from thermal energy storage systems. The molten (thermally charged) PCM freezes on a cold heat transfer surface, during thermal retrieval, forming an insulation barrier of solid PCM, between a heat transfer fluid (cold) and the molten (hot) PCM. Therefore, the heat transfer coefficient is dominated by the low thermal conductivity of the solid PCM. Thus, the heat exchange rate slows down and the thermodynamic efficiency of the thermal retrieval process is reduced. Heating element 90 may also be activated for thermal charge.

In one embodiment the at least one smaller container 70, has the form of a narrow tube. PCM container(s), in the form of narrow cylinders, maximize the surface of the PCM heat transfer surface, which is the surface of the narrow cylinder(s), thus providing a more efficient thermal charge and discharge of the PCM, as it was described in U.S. patent application Ser. No. 20140327338, submitted by the same inventor and incorporated herein by reference in its entirety. The at least one container 50, is in fluid communication with heat exchanger 140, in order to receive thermal charge from the at least one HRSG 30, by circulating HTF 60, when the at least one gas turbine 10 is in operation, or to provide thermal energy to steam turbine 20 through heat exchanger 230. The heat exchanger 140 is placed within the at least one HRSG 30 in a position that the thermal charge it receives is within the temperature operating range of HTF 60. Also, in an embodiment, an assisting tank 150, as shown in FIG. 1 is filled with heat transfer fluid, of the same kind as the HTF 60, and is in fluid communication with the at least one container 50 to enable heat transfer fluid circulation. This circulation can modify the temperature of HTF 60, thus keeping the HTF 60 in temperature operational range. A control system, not shown, assists the whole system's operation. When the at least one gas turbine 10 is in operation, PCM 80 is thermally charged through the circulation of the HTF 60. PCM 80 can also be charged by any excess electricity generated (electricity that has been generated by the renewable or any plant not needed by the electricity demand). FIG. 1 shows the at least one renewable plant 110 and the electricity grid 105 connected to the at least one electrical heating element 90, which may be an electrical resistor or a heat pump. At least one renewable plant 110 and the electricity grid 105 are capable of activating electrical heating element 90 with such an excess electricity, or even with electricity of low cost, such as the one produced at night or early morning, by conventional production.

In an embodiment, the at least one renewable plant may be a wind plant. In another embodiment, the at least one renewable plant may be a solar plant. Yet in another embodiment, the at least one renewable plant may be an ocean energy plant. Also, in another embodiment, the at least one renewable plant may be a plurality of plants. This plurality of plants may be of the same kind or of different kinds of renewable plants.

The excess electricity may be generated from a renewable electricity plant located nearby or further away from the location of the combined cycle gas turbine plant. In an embodiment, the at least one renewable plant 110 is electrically connected directly, through a dedicated line 100, to the at least one thermal energy storage and retrieval system 40, as shown in FIG. 1. This way the at least one renewable energy plant 110 may still provide electricity output even if it is disconnected from the electricity grid. The excess electricity is stored as thermal energy in PCM 80, by the function of the at least one electric heating element 90. In addition, the at least on thermal energy storage 40 is also electrically connected with the electricity grid 105, through line 115. Grid electricity can even provide backup thermal energy in order to prevent PCM solidification, if there is an on-going thermal retrieval process and there is no excess or low cost electricity at that time.

In FIG. 1, the at least one gas turbine 10 is activated by flue gas and provides rotational energy to the rotor of generator 12. Exhaust gas, from the at least one gas turbine 10 is introduced into the at least one HRSG 30, which has heating areas disposed in the form of tubes or banks of tubes (not shown). These tubes are connected by way of water/steam circuit to the at least one steam turbine 20, which produces electricity through generator 25. The at least one steam turbine 20 may include a number of pressure stages (not shown), which may be adapted to the structure of the at least one HRSG 30. In an embodiment, the at least one gas turbine 10 and the at least one steam turbine 20, are positioned in tandem to provide rotation to the same generator.

Water supply 160 provides water and/or condensate, through condenser 170, which receives the exhaust of the at least one steam turbine 20. Condenser 170 is also connected to cooling tower 180 and to preheater 200. The water or vapor steam is passed through heat exchanger 220 pumped by pump 190. The heat to exchanger 220 may be provided through thermal energy discharge through exchanger 210, which is in fluid communication with the at least on container 50, or by fossil fuel (not shown). The water/steam continues through the circuit which includes heat exchanger 230, within HRSG 30. The water/steam circuit may include a plurality of pressure stages, for example three pressure stages (not shown). The steam generated in the at least one HRSG 30 is fed to the at least one steam turbine 20, where it expands to perform work.

When the at least one gas turbine 10 is in operation, the at least one thermal energy storage system 40, is in thermal charge mode through heat exchanger 140. If the at least one gas turbine 10 is stopped, which inevitably stops producing steam through the exhaust fluid, the at least one thermal energy storage system 40 may prolong the steam turbine operation through thermal discharge and exchanger 140, if needed. Thermal discharge through heat exchanger 140 can keep steam turbine 20 properly preheated or even provide a few rotations per minute, of the steam turbine, in order to keep the steam turbine's back pressure low, which allows fast ramp-up of the gas turbine, thus providing a very fast startup of the combined cycle plant to its designated capacity.

Thermal charging through the at least on heating element 90, may occur at any time, if needed as a backup, independently from the operational status of the at least one gas turbine 10.

A control system (not shown), along with pumps, valves and sensors for temperatures and pressures (also not shown) secures HTF's 60 and PCM's 80 temperature operational characteristics, and in general the optimal operation of the whole combined cycle plant operation.

In an embodiment, shown in FIG. 2, the at least thermal energy storage system 40 is included within the at least one HRSG 32, thus being sheltered in a high temperature environment. This way the at least one heat recovery steam generator forms a novel heat-recovery, storage and steam generator (HRSSG), which is an aspect of this invention.

The HTF 60 can be an organic or a synthetic heat transfer fluid, such as Therminol VP-1 with temperature operational range from 12 to 400° C., or a eutectic mix of inorganic salts with low melting temperature point, such as Saltstream 500, with melting point of 65° C. and thermal stability limit of 500° C., provided by Halotechnics Inc., Emeryville, Calif. Suitable PCM 80 materials, provided by the same company, are inorganic salts, such as nitrate salts which provide a temperature operating range for the liquid phase from 200° C. to 560° C.

These temperature ranges can elevate steam temperature at a level that dry steam occurs, which is around 400° C. It is an aspect of this invention to further utilize latent thermal energy storage at temperatures higher than these, as the higher the steam temperature the higher the thermodynamic efficiency of the steam engine.

At dry steam temperatures, solid PCM accumulation rate is lower than in wet steam. This is due to the phenomenon that water droplets in wet steam have a tendency to stick on surfaces. This results in higher thermal conductivity of the heat exchanging walls, which accelerates PCM solidification. Therefore, in higher than the dry steam temperatures creation, mediation of HTF between the dry steam and the PCM container is not necessary. In wet steam temperatures, the use of HTF, which has the same temperature as the thermally charge PCM, allows for slower PCM solidification than in the case of running water directly on thermally charged PCM container walls. This would fast create a solid PCM layer on the heat exchange wall, which would slow down the thermodynamic efficiency of the process. Therefore, after the steam dries up it can be guided through containers or tubes, containing smaller tubes, filled with PCM, so that the dry steam further elevates its temperature.

PCMs with higher liquid phase temperature operational range are molten metals or metal alloys or molten glass. Halotechnics Inc. produces a PCM called Haloglass with stable operational range, in liquid phase, from 400° C. to 1000° C. These temperatures are suitable for supercritical or even ultra supercritical steam pressures. Suitable materials for constructing such PCM containers, such as tubes, include, but are not limited to: nickel based alloys, iron based alloys and cobalt based alloys. Examples of suitable commercially available nickel based alloys include: Hastelloy X, Hastelloy N, Hastelloy C, and Inconel 718, available from Special Metals, Inc., Conroe Tex. Example of a suitable commercially available cobalt based alloy includes: Haynes 25, available from Haynes International Inc., Windsor, Conn. Suitable material for the at least one electric heating element is molybdenum disilicide (MoSi2), available from Sentro Tech Inc., Strongsville, Ohio. Currently, there is not any single PCM material with such a broad operational temperature range to transform water from its liquid phase directly to at least supercritical steam phase. This problem is solved with the two stage thermal energy storage and retrieval system employing two different PCMs, disclosed in the present invention.

An embodiment, shown in FIG. 3, includes a second stage thermal storage, with higher temperatures from the temperatures provided by the at least one thermal energy storage 40.

This is to further heat the steam produced by the heat exchanging process of HTF 60, and can be used for preaheating the at least one steam turbine 20, at higher temperature and pressure, such as supercritical steam or even ultra supercritical steam Also, it can be used to activate an at least one non-bottoming steam turbine, which can be further included, for higher electricity capacity and flexibility of the plant. As shown in FIG. 3, the combined cycle gas turbine plant 1 further includes at least one second steam turbine 300, which may produce electricity with or without the concurrent operation of the at least one gas turbine 10. Steam turbine 300 utilizes the thermal energy stored. The additional electricity of the at least one second steam turbine 300 may be used during peak demand, combined cycle gas turbine plant maintenance, auxiliary services, emergencies etc.

The pressure of steam at the Critical Point is 221.2 bar and its saturation temperature 374.15° C. At this point the vapor and liquid are indistinguishable (wet steam). Above the critical pressure (>221.2 bar) the steam is called supercritical. It is an aspect of the present invention the production of supercritical steam from the thermal energy storage of the plant, in two stages: (1) from water to dry steam production, and (2) from dry steam to at least supercritical.

As shown in FIG. 3, at least part of the steam output of the at least one thermal energy storage system 40 may further be directed to the steam input of an at least one second thermal energy storage and retrieval system 310. System 310 includes at least one second container 320, with no heat transfer fluid in it but only air 325 instead, which contains at least one second smaller container 330, filled with a second PCM 340. PCM 340 has higher operational temperature range than PCM 80 and capable to produce at least supercritical steam. The at least one second smaller PCM container 330 has at least one second heating element 350, in proximity to the at least one second smaller PCM container walls. The at least one second heating element 350 is electrically connected to the at least one renewable plant 110 and electricity grid 105, so as to be capable of receiving excess renewable and/or grid electricity, thus thermally charging the second PCM within its temperature operating range. The steam input of the at least one second container 320 is positioned in proximity to the steam output of the at least one thermal energy storage system 40, so as to allow the dry steam generated through the thermal discharge operation of the heat exchangers 140 and 230 to further be heated, thus generating supercritical steam and even ultra supercritical steam.

In one embodiment, the at least one second container 320 has the form of a tube, or connected tubes, and the at least one second PCM container has the form of a tube with a smaller diameter than the at least one second container 320, as shown in FIG. 3.

In another embodiment, a heat pump 370 connected to the grid, shown in FIG. 3, may be used to pump heat from HRSG 30 to the at least one second thermal energy storage system 310, for thermal charging of the at least one second PCM.

FIG. 4, shows both thermal energy storage systems 40 and 310 included in the at least one HRSG 390, thus being sheltered at a high temperature environment. This way the at least one heat recovery steam generator 390 becomes the novel heat recovery, storage and steam generator (HRSSG).

An embodiment, shown in FIG. 5, further includes a plurality of parabolic collector mirrors 400, which are used to reflect sunlight toward receivers 410. In receivers 410, which may have the form of a pipe, heat transfer fluid, of the same kind as HTF 60, is circulated. The heat transfer fluid is forced to circulation by pump 430 through a fluid circuit 440 which includes the receivers 410 and a plurality of connecting pipes 460. The heat transfer fluid circuit 440 is in fluid communication with the at least one container 50. The heat transfer fluid of fluid circuit 440 is heated by collector mirrors 400 and is transferred to the at least one thermal energy storage system 40, through the at least one container 50. Thus, renewable energy is transferred to the at least one thermal energy storage 40, this time not as electricity, but as thermal energy directly produced by the sun. The heat transfer fluid is cooled, in the at least one steam turbine 20, in the process of keeping it ready for fast startups. The heat transfer fluid needs to remain within its operational temperature range, at all times, for operational stability, and this is achievable by the function of container 150, as it was described above.

In another embodiment, circuit 440 with the plurality of mirrors 400, pipes 460 and receivers 410, is part of a concentrated solar power plant, with parabolic trough/pipe circuit, which is located in proximity to the combined cycle gas turbine plant 1. This integration of the concentrated solar power plant with the flexible combined cycle gas turbine plant eliminates the challenges of the grid operators mentioned in the background section.

Yet, in another embodiment (not shown), HTF 60 is further circulated through a tank positioned on a solar power tower, with solar reflectors, plant. In this embodiment, the combined cycle gas turbine plant 1 is in proximity to the solar power tower. This integration of the solar power tower with the flexible combined cycle gas turbine plant also eliminates the challenges of the grid operators to include the renewable energy produced in the electricity source mix, mentioned in the background section.

While preferred embodiments of the present invention have been shown and described, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

The invention claimed is:

1. A combined cycle power plant with latent heat thermal energy storage, comprising:
   at least one gas turbine producing an exhaust fluid;
   at least one heat recovery, storage and steam generator (HRSSG) comprising:
   at least one heat recovery steam generator operatively connected to receive the exhaust fluid from the at least one gas turbine and a water supply;
   a first tank containing a heat transfer fluid and a plurality of metal tubes partially enclosed in the heat transfer fluid contained in the first tank, wherein each metal tube of said plurality of metal tubes encloses a phase change material;
   a first heat exchanger in fluid communication with said heat transfer fluid and the exhaust fluid, said first heat exchanger to receive a first thermal energy from said exhaust fluid for thermally charging the phase change material from the exhaust fluid when the at least one gas turbine is in operation;
   a second heat exchanger in fluid communication with said water supply and the exhaust fluid, said second heat exchanger to receive the first thermal energy from said exhaust fluid for heating said water supply to produce a gas turbine exhaust steam when the gas turbine engine is in operation; and wherein the first tank, the plurality of metal tubes, the first heat exchanger, and the second heat exchanger are located within the at least one heat recovery steam generator and exposed to the exhaust fluid;

a third heat exchanger in fluid communication with the heat transfer fluid and the water supply, said third heat exchanger upstream of the second heat exchanger in terms of a flow of the water supply, said third heat exchanger to receive a second thermal energy from the phase change material, the second thermal energy thermally discharging from the phase change material to the heat transfer fluid, the third heat exchanger to produce a thermal storage steam when the at least one gas turbine is not in operation; and at least one bottoming cycle steam turbine capable of receiving the gas turbine exhaust steam for producing electricity and the thermal storage steam for preheating said at least one bottoming cycle steam turbine.

2. The combined cycle power plant of claim 1 further comprising:

at least one electric heating element operatively connected to said phase change material, said at least one electric heating element to provide a heating element thermal energy to said phase change material; said at least one electric heating element is electrically connected to at least one renewable power plant.

3. The combined cycle power plant of claim 1 further comprising:

at least one assisting tank containing said heat transfer fluid; said at least one assisting tank is in fluid communication with said first tank.

* * * * *